(12) United States Patent
Finlaw

(10) Patent No.: US 8,010,628 B2
(45) Date of Patent: Aug. 30, 2011

(54) SOFTWARE TO PROVIDE GEOGRAPHICALLY RELEVANT WEBSITE CONTENT

(75) Inventor: Arthur P Finlaw, Panama City Beach, FL (US)

(73) Assignee: Bookit.com, Inc., Panama City Beach, FL (US)

(*) Notice: Subject to any disclaimer, the term of this patent is extended or adjusted under 35 U.S.C. 154(b) by 277 days.

(21) Appl. No.: 12/041,430

(22) Filed: Mar. 3, 2008

(65) Prior Publication Data
US 2009/0222532 A1    Sep. 3, 2009

(51) Int. Cl.
*G06F 15/16*    (2006.01)
(52) U.S. Cl. .......................................... 709/218; 709/217
(58) Field of Classification Search .................. 709/218, 709/217
See application file for complete search history.

(56) References Cited

U.S. PATENT DOCUMENTS

| | | | | |
|---|---|---|---|---|
| 5,948,040 | A * | 9/1999 | DeLorme et al. | 701/201 |
| 2001/0042023 | A1* | 11/2001 | Anderson et al. | 705/26 |
| 2002/0095256 | A1* | 7/2002 | Jones et al. | 701/200 |
| 2003/0036949 | A1* | 2/2003 | Kaddeche et al. | 705/14 |
| 2003/0212594 | A1* | 11/2003 | Hogan | 705/14 |
| 2004/0078252 | A1* | 4/2004 | Daughtrey et al. | 705/14 |
| 2005/0050097 | A1* | 3/2005 | Yeh et al. | 707/104.1 |
| 2005/0071417 | A1* | 3/2005 | Taylor et al. | 709/200 |
| 2005/0086087 | A1* | 4/2005 | Razza et al. | 705/5 |
| 2006/0259234 | A1* | 11/2006 | Flynn et al. | 701/202 |
| 2006/0259357 | A1* | 11/2006 | Chiu | 705/14 |
| 2007/0100867 | A1* | 5/2007 | Celik et al. | 707/102 |
| 2007/0161382 | A1* | 7/2007 | Melinger et al. | 455/456.1 |
| 2007/0260495 | A1* | 11/2007 | Mace et al. | 705/5 |
| 2008/0065480 | A1* | 3/2008 | Baker et al. | 705/14 |
| 2008/0072064 | A1* | 3/2008 | Franchi | 713/186 |
| 2008/0086368 | A1* | 4/2008 | Bauman et al. | 705/14 |
| 2008/0091482 | A1* | 4/2008 | Whitsett et al. | 705/6 |
| 2008/0120542 | A1* | 5/2008 | Westphal | 715/273 |
| 2008/0140476 | A1* | 6/2008 | Anand et al. | 705/7 |
| 2008/0140525 | A1* | 6/2008 | Lamsfuss et al. | 705/14 |
| 2008/0140542 | A1* | 6/2008 | Perron | 705/27 |
| 2008/0154655 | A1* | 6/2008 | Hartmann et al. | 705/5 |
| 2008/0167973 | A1* | 7/2008 | De Marcken | 705/27 |
| 2008/0201220 | A1* | 8/2008 | Broder et al. | 705/14 |
| 2008/0208643 | A1* | 8/2008 | Guastalla et al. | 705/6 |
| 2008/0243822 | A1* | 10/2008 | Campbell et al. | 707/5 |
| 2008/0307053 | A1* | 12/2008 | Mitnick et al. | 709/205 |
| 2009/0006211 | A1* | 1/2009 | Perry et al. | 705/14 |
| 2009/0216577 | A1* | 8/2009 | Killebrew | 705/7 |
| 2009/0281875 | A1* | 11/2009 | Tarka | 705/10 |

OTHER PUBLICATIONS

United Airlines. Flight Route Map 2003. p. 1.*

* cited by examiner

*Primary Examiner* — John Follansbee
*Assistant Examiner* — Imad Hussain
(74) *Attorney, Agent, or Firm* — Akerman Senterfitt; Mark D. Passler

(57) ABSTRACT

Internet based software application that identifies the geographic location of each a website visitor by their IP address to provide geographically relevant content to each individual visitor in a customized web page. In an embodiment, content can be further customized by web page viewing patterns of users in similar geographic locations. In an embodiment the software application matches the visitor's location to likely travel departure points with offerings likely to interest a visitor from said location and displays likely attractive offers dynamically to that visitor.

13 Claims, 3 Drawing Sheets

SOFTWARE TO PROVIDE GEOGRAPHICALLY RELEVANT WEBSITE CONTENT

II. BACKGROUND OF THE INVENTION

1. Field of the Invention

The present invention relates to computer software, and more particularly, to an internet website application that provides geographically relevant website content to a website visitor.

2. Description of the Related Art

Several designs for delivering geographically relevant internet content have been designed in the past. None of them, however, are known to include a passive means to identify where a discrete web page visitor is physically located and deliver at least some content relevant to that visitor's physical location.

Applicant believes that the closest reference corresponds to U.S. published patent application No. 2006/0190307 filed by Maxwell. However, it differs from the present invention because the present invention does not require that the web site visitor actively provide any information about the visitor's physical location but instead automatically attempts to determine where the web page visitor is physically located and then provide geographically relevant content based on a predetermined algorithm.

Other patents describing the closest subject matter provide for a number of more or less complicated features that fail to solve the problem in an efficient and economical way. None of these patents suggest the novel features of the present invention.

III. SUMMARY OF THE INVENTION

It is one of the main objects of the present invention to provide a means to determine where a web site visitor is physically located without any active input from that visitor and then deliver highly relevant dynamic web page content to a web site visitor based at least in part on the visitor's physical location.

It is still another object of the present invention to provide an anonymous environment where visitors of a web site can receive customized content based on their physical location.

It is yet another object of this invention to provide relevant content to a web site visitor quickly and without the need for a visitor to actively input any personal information.

It is another object of the present invention to deliver regionally relevant web page content to a web site visitor automatically based on the web site visitor's physical location.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE PREFERRED EMBODIMENT

Figure 1:
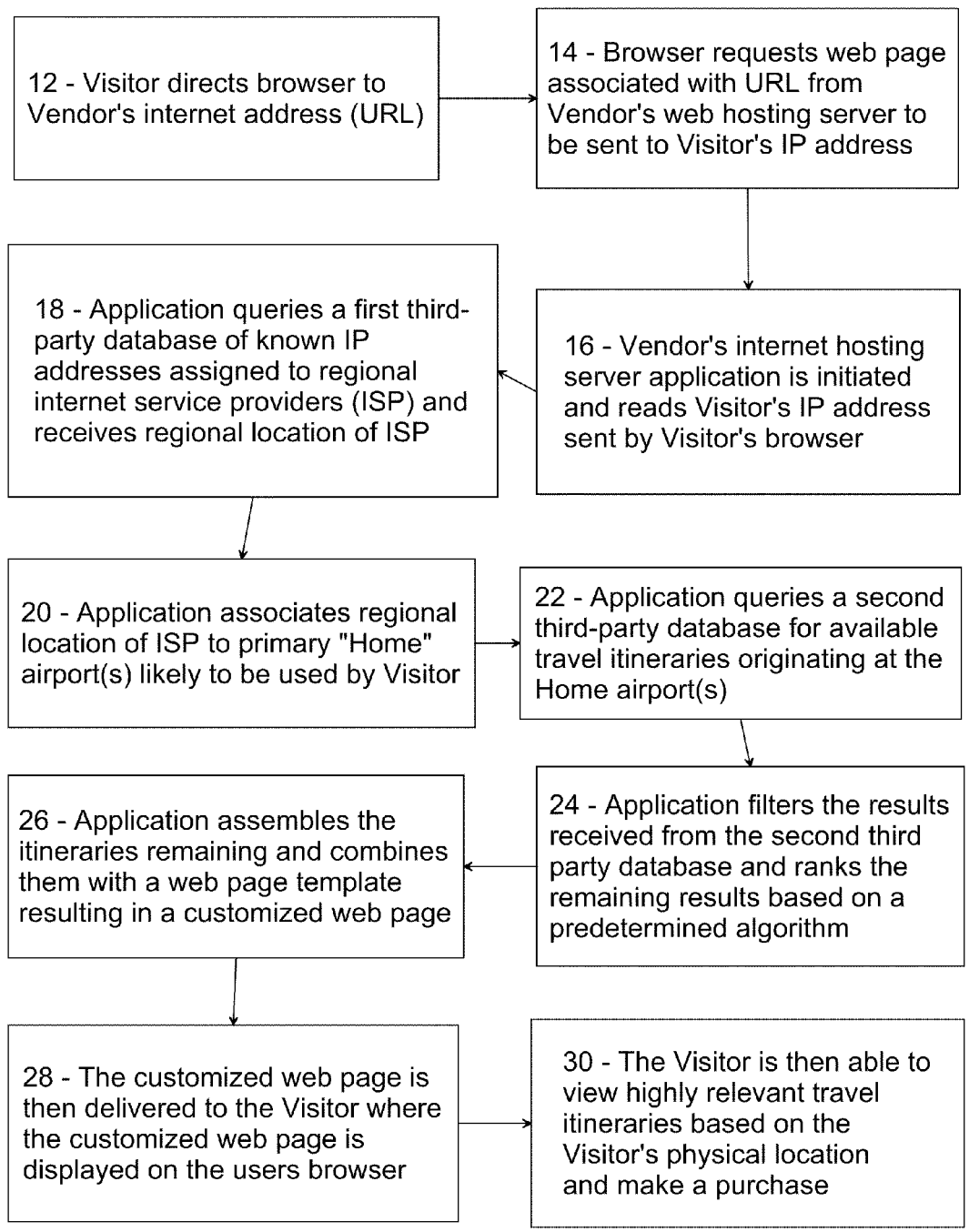
FIG. 1 represents a flow chart of software processes applied to a travel focused website.

Referring now to the drawings, where an embodiment of the present invention is generally demonstrated in FIG. 1 where the process begins at step 12 when a Visitor accesses the internet through their computer. The Visitor typically uses a browser in the Visitor's computer to view internet content graphically. The Visitor could use a common public search engine to locate a particular Vendor or search a class of vendors or the Visitor could manually type in a known internet address (uniform resource locator or URL) of a Vendor into their browser.

The Visitor's browser, as shown in step 14, sends a request directed to the Vendor's internet hosting server associated with the Vendor's URL for the return of the Vendor's website. The request includes the Visitor's unique internet protocol (IP) address so that the Vendor's internet hosting server can route a response to the request back to the specific Visitor's browser where the content can be viewed by the Visitor.

When the Visitor's request is received by the Vendor's internet hosting server the internet hosting server initiates a server-side software application as demonstrated in step 16. The software application reads the unique IP address of the Visitor and stores it into memory.

There are in existence and available to the public, sometimes as a fee based service, databases that catalog and index various information about internet service providers (ISP). Each ISP has a range of IP addresses that it assigns to its customers. Each ISP is also identified as servicing a specific region, for example a state, county or metropolitan area. Therefore, if an IP address is known the database can be searched to match the IP address to a likely physical location where the specific IP address is assigned based on the location of the ISP.

As shown in step 18 the application over the internet queries a first third-party database of IP addresses to match the IP address of the Visitor to an ISP. The ISP is typically reported as servicing a limited geographical area and therefore the likely physical location of the Visitor, based on the Visitor's IP address, is estimated.

In step 20 the application matches the Visitors location to one or more airports likely to be convenient to the Visitor and these are classified as preferred airports for that Visitor. In one embodiment the application has a predetermined set of, for example forty to eighty, primary airports from which the airport(s) convenient for a Visitor are selected. The airports are predetermined based on the likelihood of a traveler selecting that airport to initiate a flight and typically are either the busier airports or those airports servicing larger regions. The predetermined set of airports can be modified in the application as the needs of travelers or airports change.

An example of the results of the process in step 20 may be, for example, that a particular Visitor is estimated to be in the New York City area based on their IP address. The preferred airports may then be determined to be Newark International Airport, JFK International Airport or La Guardia Airport. In another example if the Visitor is estimated to be in Macon, Ga. the preferred airport may be Atlanta-Hartsfield in Atlanta, Ga.

After one or several preferred airports are determined the application queries a second third-party database as shown in step 22. The second third-party database is one or more of a commercially or publicly available database where airfares and other travel products are compiled and marketed. The application queries the second third-party database for the airfares and other travel products originating at the preferred airport(s) as determined in step 20.

In step 24 the airfare and other travel products are filtered and ranked based on a predetermined algorithm applied by the application. In one embodiment the filtering process is applied by the application to remove unlikely results returned from the query of the second third-party database. For example, the application algorithm may be set to filter out any itineraries with departure dates greater than three weeks in the future or those with fares greater than a set value. Another example may be where the application is set to filter out only those destinations with an average seasonal temperature of a predetermined value to limit the destinations to only those that have average winter temperatures warm enough to, for example, play golf or other activity.

The remaining travel products may then be ranked by the application. Certain destinations may be more popular for a particular region. For example, a Visitor in Los Angeles is much less likely to choose a Caribbean beach destination than a Mexican beach vacation whereas a visitors in Washington, D.C. often prefer a Florida beach vacation over Hawaii.

In an embodiment other criteria may also optionally be used to rank the travel products. For example, customer reviews, travel professional reviews or sales conversion rates may all have a predetermined weight when factoring a specific travel product's rank.

In an embodiment of the invention a web site cookie is placed on the Visitor's computer when they visit a Vendor's web site. The cookie may contain information related to, inter alia, what a Visitor viewed while on the Vendor's web site. Presumably, what a Visitor views is of particular interest to that Visitor. On subsequent visits to the Vendor's web site similar products are then ranked higher.

In an embodiment at step 24 the filter may rank results delivered to a Visitor based at least in part on what other Visitors of the web site in a similar geographical location viewed. Presumably, what other similarly located Visitors viewed may be of increased interest to other Visitors. This embodiment can track trends from day to day as to what Visitors from a particular location are interested.

As shown in step 26, after the application has filtered and ranked the travel products resulting in an ordered and refined set the information is formed into a customized, dynamic web page. A web page template may be pre-made with sections relevant to all regions of a greater area. For example, one United States web page template may be suitable for all regions in the United States. This is contrasted to a Canadian web page template that may be more suitable for Canadian visitors and in compliance with Canadian regulations or information of particular relevance to Canadian travelers. In general, a template may have a common navigation controls, themes and other common elements. Other areas of the web page template are reserved for dynamic, geographically relevant content.

To customize the web page to the specific individual Visitor the application merges the filtered and ranked travel products into a polished web page. The custom web page is delivered to the Visitor at step 28 without any further input from the Visitor and displayed on the Visitors browser where they are encouraged to make a purchase of the displayed travel products at step 30.

The entire progression from step 12 through step 30 occurs each time a Visitor directs her browser to the Vendor's website. Therefore the website displayed on a Visitor's browser will change as the information provided on the first third-party database or the second third-party database or as the algorithm is adjusted in the application. For example, if a Visitor visits the Vendor's website on one day and again on another day the webpage could be different because different travel products may have become available. In another example, a Visitor checking the Vendor's website at her home in Los Angeles may view a different webpage than what she viewed at her office in New York earlier that same day.

Figure 2:
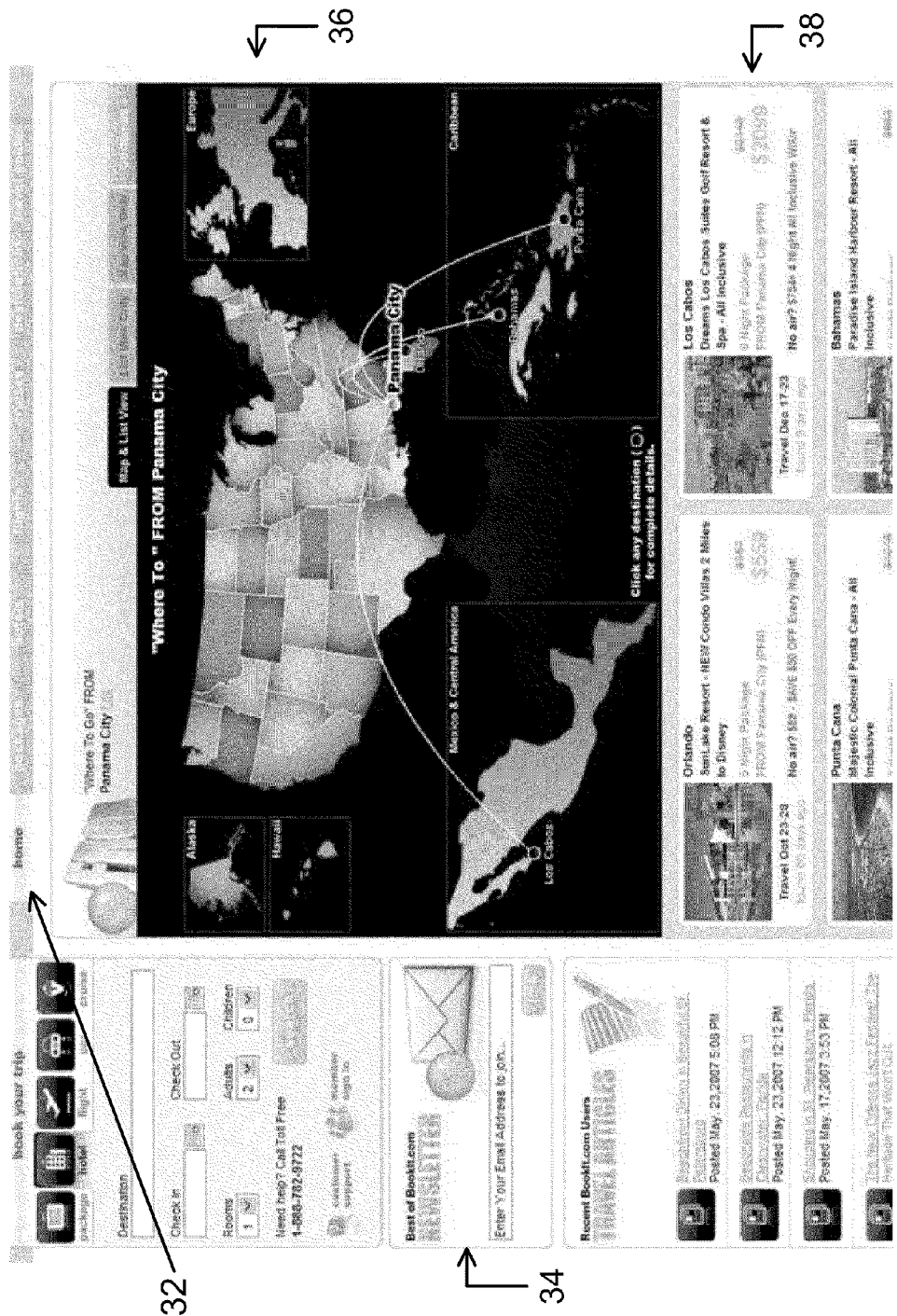
FIG. 2 shows an example of a web page delivered to a Visitor.

Now referring to FIG. 2 where an example of a web page displayed to a Visitor is shown and includes, inter alia, a frame 32, a frame 34, a frame 36 and a frame 38. FIG. 2 is essentially a screen shot of what a Visitor in or near Panama City, Fla. would see as a result of visiting a Vendor's web site. If the Visitor was physically located in a different location the web page may be different to reflect where the Visitor was.

In the example shown in FIG. 2 said frame 32 is a navigation bar that permits a Visitor to navigate to other areas of the Vendor's website. Frame 34 is an example of information that would be displayed to all visitors regardless of where they are physically located. Frame 34 may include, for example, a search feature, broad interest information or any other information that is likely to interest Visitors from a variety of physical locations. Frame 32 and frame 34 are part of the web site template described in step 26 in FIG. 1 and is included in all web pages as generated in step 26.

Still referring to FIG. 2, frame 36 is shown to include in this example, inter alia, a graphical representation of locations that a Visitor may potentially wish to travel. In this example the Visitor is geographically located in or near Panama City, Fla. The application has returned results of several possible destinations that a Visitor in Panama City may wish to travel. The possible destinations may be depicted graphically as arcs originating in Panama City and radiating to each of the several suggested possible destinations. Frame 38 shows a detail of the suggested possible destinations shown in frame 36 and invites the Visitor to obtain more information about the destination and make a purchase.

Of course, the example shown in FIG. 2 is but one of many possible layouts of a web page generated in step 26 of FIG. 1. Besides the dynamic content shown in frame 36 and frame 38 based on the physical location of the Visitor, frame 32 and frame 34 may change as styles and customs change. There could be more frames, less frames, no frames or any other layout to show at least some content geographically relevant to the Visitor based on the Visitor's location.

In an embodiment of the invention if the Visitor's IP address is unable to be matched to a physical location or the Application determined the Visitor's location in error the Visitor may manually select the correct travel origination location. Likewise if for any reason the Visitor wishes to view travel products originating at any location the Visitor may manually select that travel origination location.

In an embodiment of the invention the application saves a cookie on the Visitor's computer or a session on the Vendor's server to retain additional information about a Visitor's preferences so that in subsequent visits to the Vendor's website the Visitor's past selections are known to provide more relevant and accurate information to the Visitor.

Figure 3:
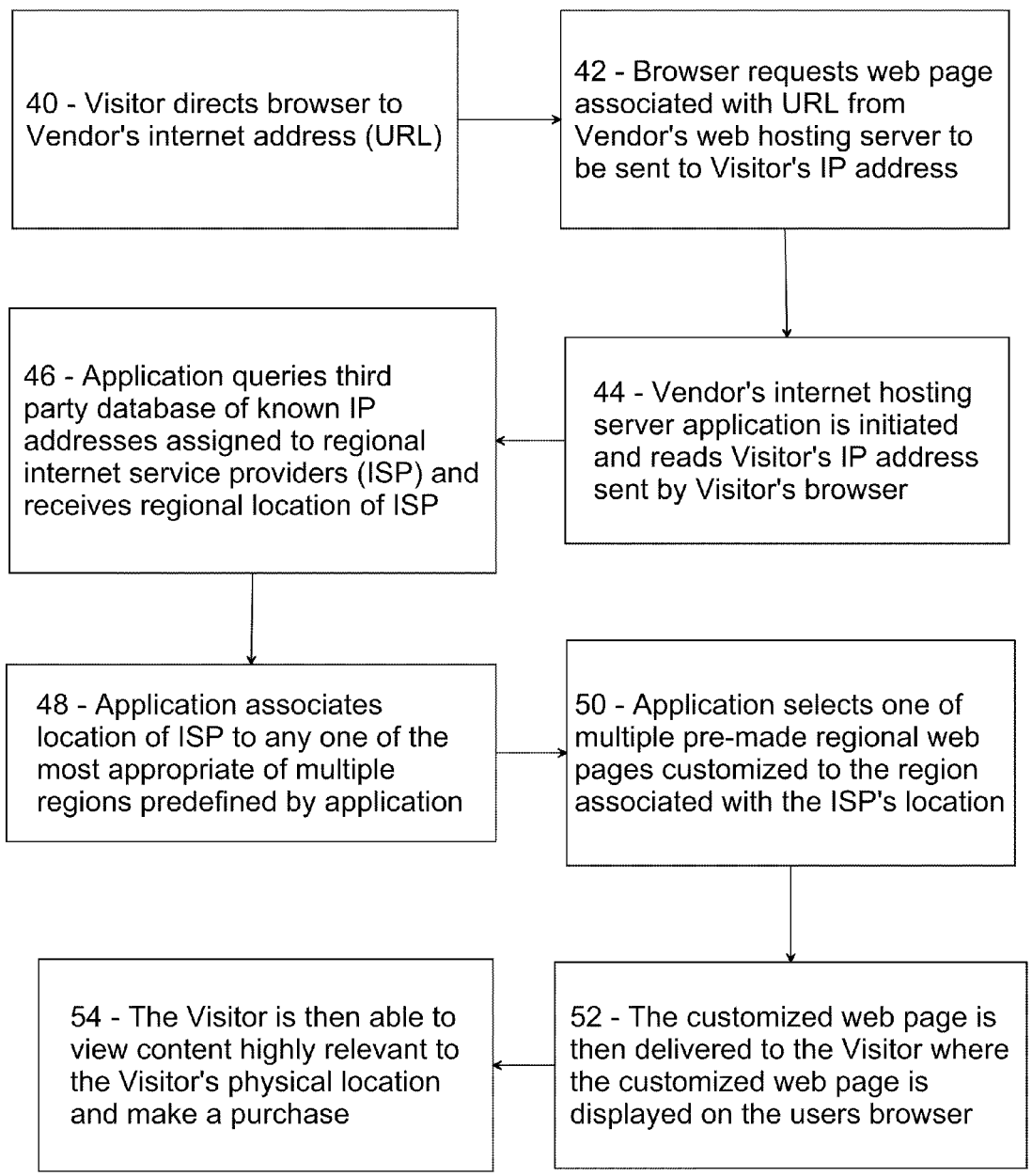
FIG. 3 illustrates a flow chart of software processes as applied to retail goods or services.

Now referring to FIG. 3 where an example of software to provide geographically relevant web site content as it may be applied to Vendors providing goods or services other than in the travel industry as described above. In step 40 a Visitor who is also a potential purchaser of the type of goods or services provided by a Vendor directs her computer to the web site of the Vendor. As is common, the Visitor can search with a third party search engine or directly enter the Vendor's URL into the address bar of her browser.

In step 42 the browser sends a request for the Vendor's web page to the Vendor's web hosting server to return the Vendor's web page the Visitors IP address.

Instead of simply returning a pre-designed static web page to the Visitor as does the prior art, as shown in step 44 an application on the server side of the internet connection is initiated and receives the Visitor's IP address and stores it into memory.

There are in existence and available to the public, sometimes as a fee based service, databases that catalog and index various information about internet service providers (ISP). Each ISP has a range of IP addresses that it assigns to its customers. Each ISP is also identified as servicing a specific region, for example a state, county or metropolitan area. Therefore, if an IP address is known the database can be searched to match the IP address to a likely physical location where the specific IP address is assigned based on the location of the ISP.

As shown in step 46 the application over the internet queries a third-party database of IP addresses to match the IP address of the Visitor to an ISP. The ISP is typically reported as servicing a limited geographical area and therefore the likely physical location of the Visitor, based on the Visitor's IP address, is estimated.

In step 48 the application then matches the estimated physical location of the Visitor with any of several predefined geographic regions. For example, if a Vendor primarily only services the United States the geographic regions could be defined as mid-west states, western states, north-east states, south-east states, south-west states and north-west states. Another example may be that each state is its own geographic region. Another example may be each city with a population over a certain size is surrounded by a predefined region. Of course, the predefined geographic regions can be customized to suit a particular Vendor's requirements to be as large or small as desired.

Once a Visitor is matched to a predefined geographic region a pre-made website corresponding to that region is selected in step 50 and sent to the Visitors IP address where it is displayed on the Visitor's computer screen in step 52. The Visitor in step 54 is then able to view content relevant to their physical location and make a purchase.

In an embodiment of the invention if the Visitor's IP address is unable to be matched to a physical location or the application determined the Visitor's location in error the Visitor may manually select the correct region.

In an embodiment of the invention a web site cookie is placed on the Visitor's computer when they visit a Vendor's web site. The cookie may contain information related to, inter alia, what a Visitor viewed while on the Vendor's web site. Presumably, what a Visitor views is of particular interest to that Visitor. On subsequent visits to the Vendor's web site can then rank similar products higher.

In an embodiment at step 50 the filter may rank results delivered to a Visitor based at least in part on what other Visitors of the web site in a similar geographical location viewed. Presumably, what other similarly located Visitors viewed may be of increased interest to other Visitors. This embodiment may optionally track trends from day to day as to what Visitors from a particular location are interested. A web page more suited to recent viewing trends may then be provided to the Visitor.

An example of the software as shown in FIG. 3 may be when a Visitor directs their computer to go to a popular chain of hardware stores. The Visitor's IP address is indicated to be originating from Chicago, Ill. If the time of year is January the hardware store may want to rank higher snow shovels to display to the Visitor. On the same day the same hardware store chain may prefer to show lawn furniture to a Visitor from Miami, Fla. without needlessly showing snow shovels to this Visitor. Therefore, it can be appreciated that geographically relevant web site content can be selected to offer more relevant products or service to Visitors based on where they are physically located.

The present invention is A computer based system for providing geographically relevant internet content to a website visitor comprising an application on a server of a website that reads the IP address of a visitor to said website. Said application queries the website visitor's IP address against a first database of IP addresses with known geographic locations and determines a physical geographic regional location estimated to be that of the visitor. Said application selects a preferred departure point from a set of predetermined departure points based on the physical geographic region estimated to be that of the website visitor. Said application queries a second database of travel products and receives a set of preferred travel products that originate at said preferred departure point. Said application applies a filter and a ranking algorithm to the set of preferred travel products resulting in a set of selected travel products. Said application compiles a web page incorporating said set of selected travel products and delivers said web page to the website visitor.

In an embodiment said preferred departure point may be an airport, bus station, sea port or train station. In another embodiment said ranking algorithm removes travel products unlikely to be purchased by the website visitor from said set of preferred travel products. In another embodiment said filter removes travel products unlikely to be purchased by the website visitor from said set of preferred travel products. In another embodiment said application selects two, three, four, five or six preferred departure points and delivers preferred travel products originating at any of said preferred departure points.

Another embodiment of the invention is computer based system for providing geographically relevant internet content to a website visitor comprising an application on a server of a website that reads the IP address of a website visitor. Said application queries the website visitor's IP address against a database of IP addresses with known geographic locations and determines a physical geographic regional location estimated to be that of the website visitor. Said application selects a preferred region from a set of predetermined region based on the physical geographic region estimated to be that of the website visitor. Said application selects a pre-made web page that most appropriately matches the selected preferred region and delivers said web page to the website visitor. Optionally, said application further selects a pre-made web page based on prior purchases made by other visitors from a similar geographic region as the present visitor.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A computer-based system for providing geographically relevant internet content, the computer-based system comprising:

an internet hosting server configured to receive an initial request for internet content associated with a website from a browser operating on a remote computer, the initial request for content associated with the website being initiated by a first-time visitor to the website entering an internet address of the website directly into the browser or selecting the internet address of the website via a search engine;

a memory configured to store an internet protocol (IP) address of the remote computer that is retrieved by the internet hosting server after the internet hosting server receives the initial request for internet content from the browser operating on the remote computer;

a software application configured to perform a first query of a first third-party database of IP addresses to match the IP address of the remote computer to an internet service provider (ISP), and estimate an estimated location of the remote computer based upon results of the first query of the first third-party database of IP addresses;

wherein, after estimating the estimated location of the remote computer, the software application automatically:

selects a preferred departure point from a predetermined set of departure points based upon the estimated location of the remote computer determined;

performs a second query of a second third-party database of travel products comprising resort and flight package deals to locate available travel itineraries originating at the preferred departure point selected using the estimated location of the remote computer;

identifies geographically relevant resort and flight package deals without user input by removing travel products unlikely to be purchased by the first-time visitor from among the available travel itineraries originating at the preferred departure point selected using the estimated location of the remote computer based upon the estimated location of the remote computer determined from the IP address of the remote computer; and generates a user-customized, dynamic webpage that includes a visual representation for each of the geographically relevant resort and flight package deals that were identified, the visual representation including information regarding a resort associated with each of the geographically relevant resort and flight package deals, wherein the internet hosting server delivers the user-customized dynamic webpage to the browser on the remote computer such that after the internet hosting server receives the initial request for internet content associated with the website from the browser operating on the remote computer, non-preferred resort and flight package deals are removed from the available travel itineraries originating at the preferred departure point such that travel products originating at the preferred departure point that are initially and automatically displayed on the browser include only visual representations of the geographically relevant resort and flight package deals, the geographically relevant resort and flight packages deals being automatically displayed without requiring user input from the first-time visitor once at the website nor access to information specific to the first-time visitor.

2. The computer-based system for providing geographically relevant internet content of claim 1, wherein the geographically relevant resort and flight package deals are ranked by average seasonal temperature.

3. The computer-based system for providing geographically relevant internet content of claim 1, wherein the geographically relevant resort and flight package deals are ranked by customer reviews.

4. The computer-based system for providing geographically relevant internet content of claim 1, wherein the user-customized, dynamic webpage includes a map and graphically depicts the preferred departure point and only destinations associated with the geographically relevant resort and flight package deals on the map such that resort and flight package deals associated with destinations determined to be non-preferred are not initially displayed on the map.

5. The computer-based system for providing geographically relevant internet content of claim 4, wherein the user-customized, dynamic webpage graphically depicts traveling from the preferred departure point to only the destinations associated with the geographically relevant resort and flight package deals as arcs originating from the preferred departure point and radiating to each of the destinations associated with the geographically relevant resort and flight package deals.

6. The computer-based system for providing geographically relevant internet content of claim 1, wherein the user-customized, dynamic webpage includes a map graphically depicting the preferred departure point and only destinations associated with the geographically relevant resort and flight package deals, and a window virtually representing the destinations associated with the geographically relevant resort and flight package deals and permitting retrieval of additional information associated with each destination virtually represented within the window.

7. A computer-based system for providing geographically relevant internet content, the computer-based system comprising:

an internet hosting server configured to receive an initial request for internet content associated with a website from a browser operating on a remote computer, the initial request for content associated with the website being initiated by a first-time visitor to the website entering an internet address of the website directly into the browser or selecting the internet address of the website via a search engine;

a memory configured to store an internet protocol (IP) address of the remote computer that is retrieved by the internet hosting server after the internet hosting server receives the initial request for internet content from the browser operating on the remote computer;

a software application configured to:

perform a first query of a first third-party database of IP addresses to match the IP address of the remote computer to an internet service provider (ISP);

estimate an estimated location of the remote computer based upon results of the first query of the first third-party database of IP addresses;

select a preferred departure point from a predetermined set of departure points based upon the estimated location of the remote computer;

perform a second query of a second third-party database of travel products comprising resort and flight package deals to locate available travel itineraries originating at the preferred departure point selected using the estimated location of the remote computer;

identify preferred resort and flight package deals by using the estimated location of the remote computer determined from the IP address of the remote computer to remove travel products unlikely to be purchased by the first-time visitor to the website from among the available travel itineraries originating at the preferred departure point selected using the estimated location of the remote computer that were identified by the second query; and dynamically generate a user-customized, dynamic webpage that includes information regarding the preferred resort and flight package deals that were identified based upon the estimated location of the remote computer determined from the IP address of the remote computer, wherein, after the internet hosting server receives the initial request for internet content associated with the website, the internet hosting server automatically delivers the user-customized, dynamic webpage to the browser on the remote computer such that a name and a picture of a resort for each of the preferred resort and flight packages is displayed without either active input from a first-time visitor once at the website or accessing information specific to the first-time visitor to facilitate remote purchase of the preferred resort and flight packages via the user-customized, dynamic webpage.

8. The computer-based system for providing geographically relevant internet content of claim 7, wherein the user-customized, dynamic webpage includes a map that graphically depicts the preferred departure point and only destinations associated with the preferred resort and flight package deals.

9. A computer-based system for providing geographically relevant internet content, the computer-based system comprising:

an internet hosting server configured to receive an initial request for internet content associated with a website from a browser operating on a remote computer, the initial request for content associated with the website being initiated by a first-time visitor to the website entering an internet address directly into the browser or selecting the internet address via a search engine;

a memory configured to store an internet protocol (IP) address of the remote computer that is retrieved by the internet hosting server after the internet hosting server receives the initial request for internet content from the browser operating on the remote computer;

a software application configured to:
perform a first query of a first third-party database of IP addresses to match the IP address of the remote computer to an internet service provider (ISP);
estimate an estimated location of the remote computer based upon results of the first query of the first third-party database of IP addresses;
select a preferred departure point from a predetermined set of departure points based solely upon the estimated location of the remote computer;
perform a second query of a second third-party database of resort and flight packages for available travel itineraries originating at the preferred departure point selected using the estimated location of the remote computer,
identifying geographically relevant resort and flight packages from among the available travel itineraries originating at the preferred departure point selected using the estimated location of the remote computer by removing resort and flight packages unlikely to be purchased by the first-time visitor to the website from among the available travel itineraries originating at the preferred departure point selected using the estimated location of the remote computer based upon the estimated location of the remote computer determined from the IP address of the remote computer; and
dynamically generate a user-customized, dynamic webpage that includes information regarding an associated resort for each of the geographically relevant resort and flight packages, wherein, after the internet hosting server receives the initial request for internet content associated with the website, the internet hosting server automatically delivers the user-customized, dynamic webpage to the browser on the remote computer such that (1) the first-time visitor to the website can view the geographically relevant resort and flight packages by only entering or selecting the internet address of the website and without any active input from the first-time visitor once at the website, and (2) travel products originating at the preferred departure point that are initially displayed by the browser include only resort and flight packages determined to be geographically relevant based upon the estimated location of the remote computer determined from the IP address of the remote computer.

10. The computer-based system for providing geographically relevant internet content of claim 9, wherein, the user-customized, dynamic webpage includes a template selected based upon the estimated location of the remote computer, and for each of the geographically relevant resort and flight packages, the user-customized, dynamic webpage automatically displays a name and a picture of the associated resort and a price without requiring active input from the first-time visitor.

11. The computer-based system for providing geographically relevant internet content of claim 9, wherein the geographically relevant resort and flight packages are further filtered based upon customer reviews.

12. The computer-based system for providing geographically relevant internet content of claim 9, wherein the user-customized, dynamic webpage is configured to facilitate manual searching of travel products once the first-time visitor is at the website.

13. The computer-based system for providing geographically relevant internet content of claim 9, wherein the user-customized, dynamic webpage includes a map and graphically depicts the preferred departure point and only destinations associated with the geographically relevant resort and flight package deals on the map such that resort and flight package deals associated with non-preferred destinations are not initially displayed to the first-time visitor once at the website.

* * * * *